US 9,896,211 B2

(12) United States Patent
Matsui et al.

(10) Patent No.: US 9,896,211 B2
(45) Date of Patent: Feb. 20, 2018

(54) CONTROL DEVICE, LIGHTING SYSTEM, MOBILE OBJECT

(71) Applicant: Panasonic Intellectual Property Management Co., Ltd., Osaka (JP)

(72) Inventors: Nobuyuki Matsui, Osaka (JP); Youji Tachino, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/450,226

(22) Filed: Mar. 6, 2017

(65) Prior Publication Data

US 2017/0253336 A1    Sep. 7, 2017

(30) Foreign Application Priority Data

Mar. 7, 2016  (JP) .................................. 2016-043713

(51) Int. Cl.

| | |
|---|---|
| *H05B 33/08* | (2006.01) |
| *H05B 37/02* | (2006.01) |
| *B64D 11/00* | (2006.01) |
| *F21S 4/28* | (2016.01) |
| *F21K 9/61* | (2016.01) |
| *F21Y 115/10* | (2016.01) |
| *F21V 3/02* | (2006.01) |

(Continued)

(52) U.S. Cl.
CPC ......... *B64D 11/00* (2013.01); *H05B 33/0851* (2013.01); *H05B 33/0866* (2013.01); *B64D 2011/0038* (2013.01); *F21K 9/61* (2016.08); *F21S 4/28* (2016.01); *F21V 3/02* (2013.01); *F21V 5/04* (2013.01); *F21V 17/12* (2013.01); *F21Y 2115/10* (2016.08)

(58) Field of Classification Search
None
See application file for complete search history.

(56) References Cited

U.S. PATENT DOCUMENTS 7,570,315 B2 *   8/2009   Tanaka .............. G02F 1/133385
                                                            315/32

FOREIGN PATENT DOCUMENTS

| JP | 2003-017278 A | | 1/2003 |
|---|---|---|---|
| JP | 2013003401 A | * | 1/2013 |

* cited by examiner

*Primary Examiner* — Dedei K Hammond
(74) *Attorney, Agent, or Firm* — McDermott Will & Emery LLP

(57) ABSTRACT

The control device individually controls operations of the two or more lighting devices. Each lighting device includes a light source, a sensor for measuring light intensity of the light source, and a controller circuit for controlling the light source. The control device includes a replacement detector circuit, and the replacement detector circuit determines whether any of the lighting devices has been replaced, and obtains a determination result distinguishing a replacement lighting device from remaining lighting device(s). When the replacement detector circuit has obtained the determination result, the control device controls at least one of the lighting devices based on the measurement value outputted from the sensor of the replacement lighting device and the measurement value(s) outputted from the sensor(s) of the remaining lighting device(s), so that a difference between light intensity of the replacement lighting device and light intensity derived from the remaining lighting device(s) falls within a predetermined range.

7 Claims, 8 Drawing Sheets

(51) Int. Cl.
*F21V 5/04* (2006.01)
*F21V 17/12* (2006.01)

CONTROL DEVICE, LIGHTING SYSTEM, MOBILE OBJECT

CROSS-REFERENCE TO RELATED APPLICATION

The present application is based upon and claims the benefit of priority of Japanese Patent Application No. 2016-043713, filed on Mar. 7, 2016, the entire contents of which are incorporated herein by reference.

TECHNICAL FIELD

The present disclosure relates to control devices, lighting systems including the control devices, mobile objects including the lighting systems, and in particular relates to a control device for controlling light outputs of individual two or more lighting devices, a lighting system including the control device, and a mobile object including the lighting system.

BACKGROUND ART

Now, lighting systems for controlling light outputs of two or more lighting devices are used.

There has been known, as such lighting systems, a lighting system including two or more lighting devices and a controller circuit (for example, JP 2003-17278 A).

In the lighting system of JP 2003-17278 A, the controller circuit sets light outputs of lamps of the lighting devices to desired values, by providing dimming signals with dimming ratios adjusted according to lengths of total lighting time of the lamps to the lighting devices. The lighting device includes an adjuster and an adjustment canceller. When notified of replacement of the lamp, the adjuster controls power supplied to the lamp by adjusting the dimming ratio indicated by the dimming signal so as to set the light output of the replacement lamp to be close to the desired value. When notified of reset of the total lighting time from the controller circuit, the adjustment canceler ends the adjustment of the dimming ratio by the adjuster.

JP 2003-17278 A discloses that, if a lamp of one of the lighting devices is replaced with a replacement lamp, the lighting system can suppress the replacement lamp from becoming brighter than other lamps.

Note that, such lighting systems are required to reduce differences between light intensities of two or more lighting devices, and the above configuration of JP 2003-17278 A does not satisfy such requirements, and further improvement is highly demanded.

An object of the present disclosure would be to propose a control device capable of reducing differences between light intensities of two or more lighting devices, a lighting system including the control device, and a mobile object including the lighting system.

SUMMARY

The control device of one aspect according to the present disclosure is a control device for individually controlling operations of the two or more lighting devices. Each of the two or more lighting devices includes at least one light source, a sensor, and a controller circuit. The sensor is configured to output a measurement value obtained by measuring light intensity of the at least one light source. The controller circuit is configured to control lighting state of the at least one light source according to a command from the control device. The control device includes a replacement detector circuit. The replacement detector circuit is configured to determine whether any of the two or more lighting devices has been replaced with a replacement lighting device. The replacement detector circuit is configured to obtain a determination result distinguishing the replacement lighting device from one or more remaining lighting devices of the two or more lighting devices. The control device is configured to, when the replacement detector circuit has obtained the determination result, control at least one of the two or more lighting devices based on the measurement value outputted from the sensor of the replacement lighting device and the one or more measurement values outputted from the one or more sensors of the one or more remaining lighting devices, so that a difference between a light intensity of the replacement lighting device and a light intensity derived from the one or more remaining lighting devices falls within a predetermined range.

The lighting system according to one aspect of the present disclosure includes the control device and the two or more lighting devices.

The mobile object according to one aspect of the present disclosure includes the lighting system and a main body on which the lighting system is mounted.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

Hereinafter, the lighting system 20 of the present embodiment is described with reference to FIG. 1 to FIG. 7. Lighting devices 10 in the lighting system 20 of the present embodiment are described with reference to FIG. 3 to FIG. 7. In the figures, same or similar members may be designated by same or similar reference sings for the purpose of avoiding redundant explanation. The sizes of the members and the positional relations between the members shown in the figures may be exaggerated for the purpose of clarifying the explanation. In the following explanation, with regard to the components constituting the lighting system 20 of the present embodiment, two or more components may be realized by a single part, and a single part may serve as two or more components, and multiple parts may cooperate with each other to realize a function of a single part.

The lighting system 20 of the present embodiment includes, as shown in, FIG. 1, FIG. 2A, FIG. 2B and FIG. 2C, two or more lighting devices 10, and a control device 21.

Figure 1:
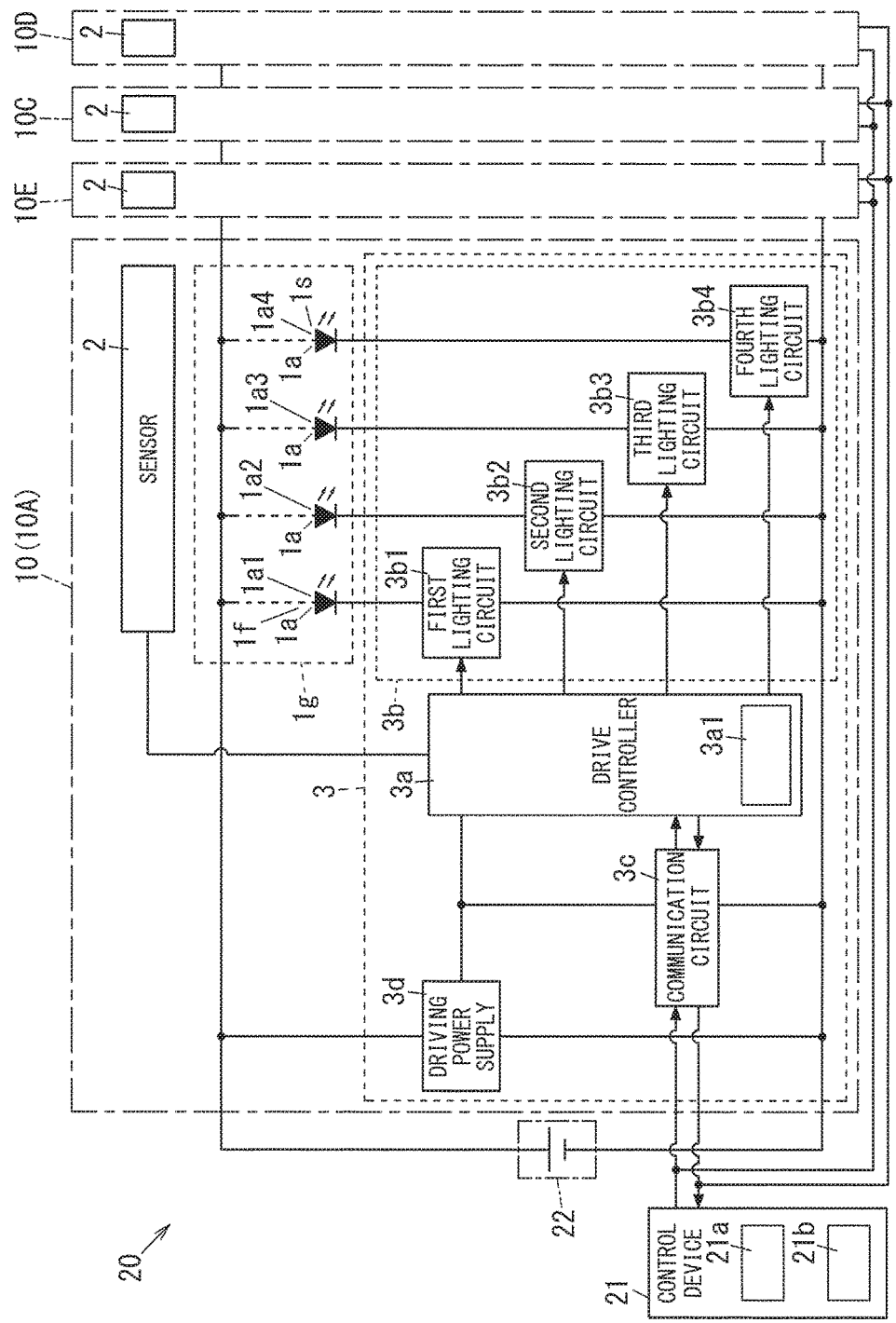
FIG. 1 is a circuit diagram of the lighting system of one embodiment.
Figure 2A:
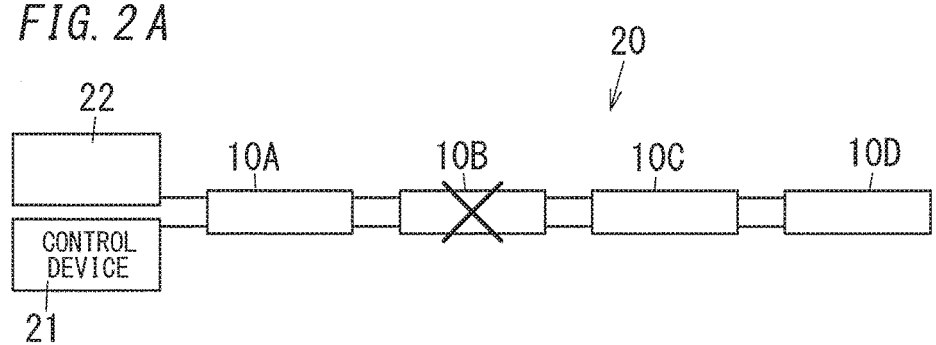
FIG. 2A to FIG. 2C are schematic diagrams of operations of the above lighting system.
Figure 2B:
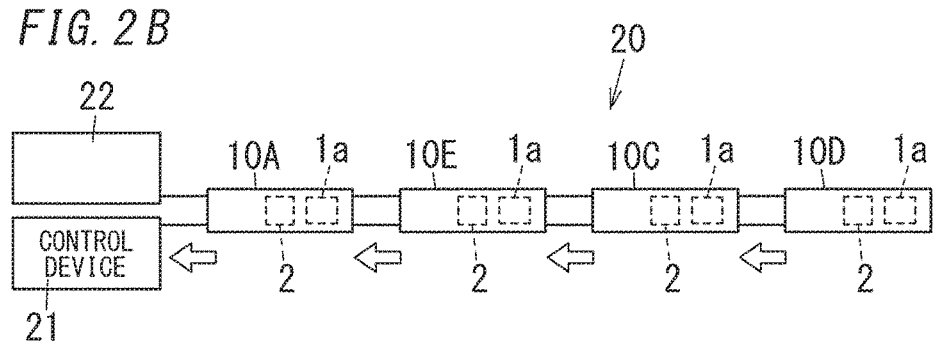
Figure 2C:
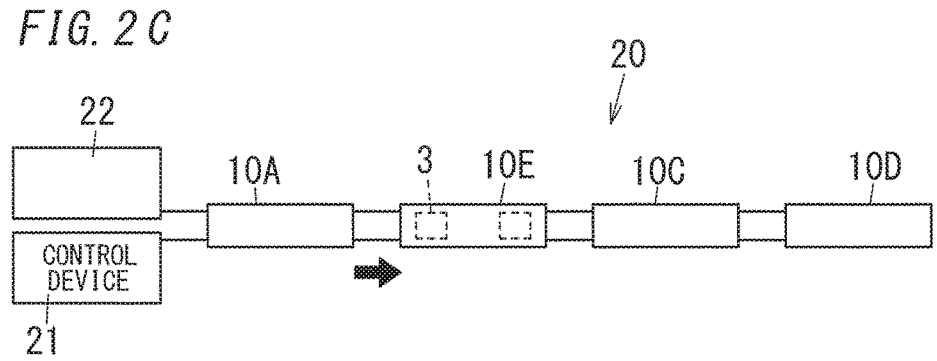

The control device 21 is configured to individually control operations of the two or more lighting devices 10. As shown in FIG. 1, FIG. 2A, FIG. 2B and FIG. 2C, the two or more lighting devices 10 include four lighting devices 10. In FIG. 1, FIG. 2B and FIG. 2C, the four lighting devices 10 are a first lighting device 10A, a fifth lighting device 10E, a third lighting device 10C, and a fourth lighting device 10D. In FIG. 2A, the four lighting devices 10 are the first lighting device 10A, a second lighting device 10B, the third lighting device 10C, and the fourth lighting device 10D. The first lighting device 10A, the second lighting device 10B, the third lighting device 10C, the fourth lighting device 10D, and the fifth lighting device 10E have the same configuration.

Hereinafter, the lighting devices 10 are described with reference to the first lighting device 10A shown in FIG. 1.

Each of the two or more lighting devices 10 includes at least one light source 1a, a sensor 2, and a controller circuit 3. The sensor 2 is configured to output a measurement value obtained by measuring a light intensity of the at least one light source 1a. The controller circuit 3 is configured to control a lighting state of the at least one light source 1a according to a command from the control device 21.

The control device 21 includes a replacement detector circuit 21a. The replacement detector circuit 21a is configured to determine whether any of the two or more lighting devices 10 has been replaced with a replacement lighting device 10. The replacement detector circuit 21a is configured to obtain a determination result distinguishing the replacement lighting device 10 from one or more remaining lighting devices 10 of the two or more lighting devices 10. FIG. 1, FIG. 2B and FIG. 2C relate to situations in which the second lighting device 10B shown in FIG. 2A has been replaced with the fifth lighting device 10E. In other words, with regard to FIG. 1, FIG. 2B and FIG. 2C, the fifth lighting device 10E is a replacement lighting device 10, and the first lighting device 10A, the third lighting device 10C, and the fourth lighting device 10D are one or more remaining lighting devices 10.

The control device 21 is configured to control at least one lighting device 10 of the two or more lighting devices 10 based on measurement results obtained corresponding to the determination result, so that a difference between a light intensity of the replacement lighting device 10 and a light intensity derived from the one or more remaining lighting devices 10 falls within a predetermined range. The measurement result indicates a value corresponding to a measurement value. In other words, the control device 21 is configured to, when the replacement detector circuit 21a has obtained the determination result, control at least one lighting device 10 of the two or more lighting devices 10 based on the measurement value outputted from the sensor 2 of the replacement lighting device 10 and the one or more measurement values outputted from the one or more sensors 2 of the one or more remaining lighting devices 10, so that a difference between a light intensity of the replacement lighting device 10 and a light intensity derived from the one or more remaining lighting devices 10 falls within a predetermined range. The predetermined range is, for example, set to a range to an extent that a person cannot distinguish between a light intensity of the replacement lighting device 10 and a light intensity derived from the one or more remaining lighting devices 10. The predetermined range is, for example, a range of −10% to +10% of a desired light intensity. The desired light intensity may be selected from the light intensity of the replacement lighting device 10 and light intensity derived from the one or more remaining lighting devices 10.

In the lighting system 20 of the present embodiment, the control device 21 controls the lighting device(s) 10 so that a difference between a light intensity of the replacement lighting device 10 and a light intensity derived from the one or more remaining lighting devices 10 falls within the predetermined range. Therefore, it is possible to more reduce differences between light intensities of the two or more lighting devices 10.

Hereinafter, the lighting system 20 of the present embodiment is described in more detail.

In the lighting system 20 of the present embodiment, the four lighting devices 10 are electrically connected to an external power supply 22 in such a wiring manner that the four lighting devices 10 transfer energy from one another. The external power supply 22 may be configured to supply a DC voltage of 28 V, for example. Each lighting device 10 is electrically connected to the external power supply 22 so as to energize its light sources 1a.

The lighting device 10 includes, as the light sources 1a, at least a first light source 1f and a second light source 1s. In the lighting device 10 in the present embodiment, the light sources 1a include two or more types of LEDs (light emitting diodes) with different emission colors. As shown in FIG. 1, the two or more types of the light sources 1a with different emission colors include a red LED 1a1 configured to emit red light, a green LED 1a2 configured to emit green light, a blue LED 1a3 configured to emit blue light, and a white LED 1a4 configured to emit white light.

In the following, first of all, a relationship between lighting of the light sources 1a and measurement of light intensities by the sensor 2 in the lighting device 10 is described.

The controller circuit 3 is configured to repeat a cycle multiple times. The cycle is defined as a set of a first time period and a second time period. The controller circuit 3 is configured to control lighting state of the at least one light source 1a so that mixed light of light from the first light source 1f and light from the second light source 1s has a same light intensity for each cycle. In this regard, the mixed light means a mixture of light from the first light source 1f and light from the second light source 1s so that it has substantially a single color for human eyes. Examples of the mixed light may include white light without intensity unevenness in a case of mixture of different white light. Examples of the mixed light may include white light without color unevenness in a case of mixture of red light, green light, and blue light.

In the first time period, the controller circuit 3 controls only a light source is which either the first light source 1f or the second light source 1s and of which a light intensity is to be measured by the sensor 2, to emit light. In other words, in the first time period, the controller circuit 3 controls a light source which is either the first light source 1f or the second light source 1s to emit light so as to allow the sensor 2 to measure a light intensity of the light. The first time period is defined as a single color time period in which only one type of light source 1a which is selected from the two or more types of light sources 1a is allowed to emit light. In the second time period, the controller circuit 3 controls the first light source 1f and the second light source 1s to emit light. The second time period is defined as a mixed color time period in which two or more types of light sources 1a are allowed to emit light.

Figure 3:
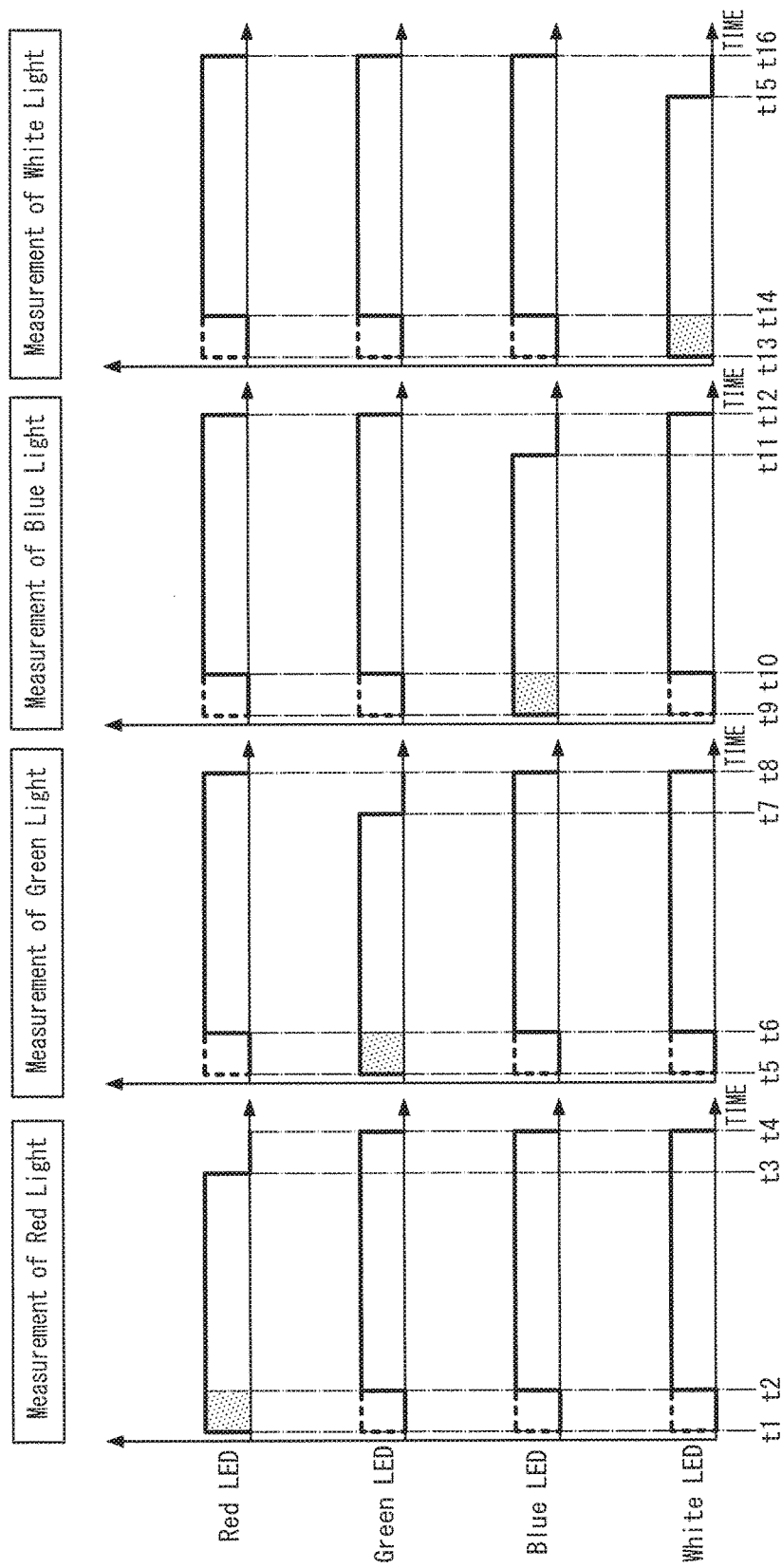
FIG. 3 is a graph for illustration of operations of the controller circuit of the above lighting system.

In FIG. 3, as for the lighting device 10, a time period from time t1 to time t4 corresponds to one cycle of multiple cycles, which includes one time period from time t1, to time t2 corresponding to the single color time period for allowing only the red LED 1a1 to emit light, and a remaining time period from time t2 to time t4 corresponding to the mixed color time period. Hereinafter, the single color time period for allowing only the red LED 1a1 to emit light may be also referred to as the first single color time period T1. In FIG. 3, for example, to measure red light, the red LED 1a1 is selected as the one type of the light source 1a, and the two or more types of light sources 1a are the red LED 1a1, the green LED 1a2, the blue LED 1a3, and the white LED 1a4. Likewise, a time period from time t5 to time t8 corresponds to another cycle of the multiple cycles, which includes one time period from time t5 to time t6 corresponding to the single color time period for allowing only the green LED 1a2 to emit light, and a remaining time period from time t6 to time t8 corresponding to the mixed color time period. Hereinafter, the single color time period for allowing only the green LED 1a2 to emit light may be also referred to as the second single color time period T2. A time period from time t9 to time t12 corresponds to another cycle of the multiple cycles, which includes one time period from time t9 to time t10 corresponding to the single color time period for allowing only the blue LED 1a3 to emit light, and a remaining time period from time t10 to time t12 corresponding to the mixed color time period. Hereinafter, the single color time period for allowing only the blue LED 1a3 to emit light may be also referred to as the third single color time period T3. A time period from time t13 to time t16 corresponds to another cycle of the multiple cycles, which includes one time period from time 13 to time t14 corresponding to the single color time period for allowing only the white LED 1a4 to emit light, and a remaining time period from time t14 to time t16 corresponding to the mixed color time period. Hereinafter, the single color time period for allowing only the white LED 1a4 to emit light may be also referred to as the fourth single color time period T4. Mixed light, which is mixture of light of the red LED 1a1, the green LED 1a2, the blue LED 1a3, and the white LED 1a4, of the cycles can be perceived as light having the same emission colors for human eyes. In this regard, as for mixed light emitted from the lighting device 10 in the multiple cycles, the phrase "the same emission color" may mean emission colors identical to each other in a strict sense or emission colors which cannot be substantially distinguished from each other by human eyes.

The controller circuit 3 sets timings for start of lighting light sources 1a which are of the different emission types of light sources 1a and is not selected as a measurement object, to be later than a timing after the single color time period at which measurement of the light intensity of the light source 1a selected as the measurement object. The controller circuit 3 controls the lighting states of the two or more types of light sources 1a so that mixed light produced by two or more types of light in the multiple cycles has the same emission color.

In a case of lighting all of the different light emission types of light sources 1a, in order to measure a light intensity of a desired light source 1a, the lighting system 20 makes a timing of lighting the light source 1a which is selected as the measurement object, different from timings of lighting the light sources 1a which are not selected as the measurement object.

Figure 4:
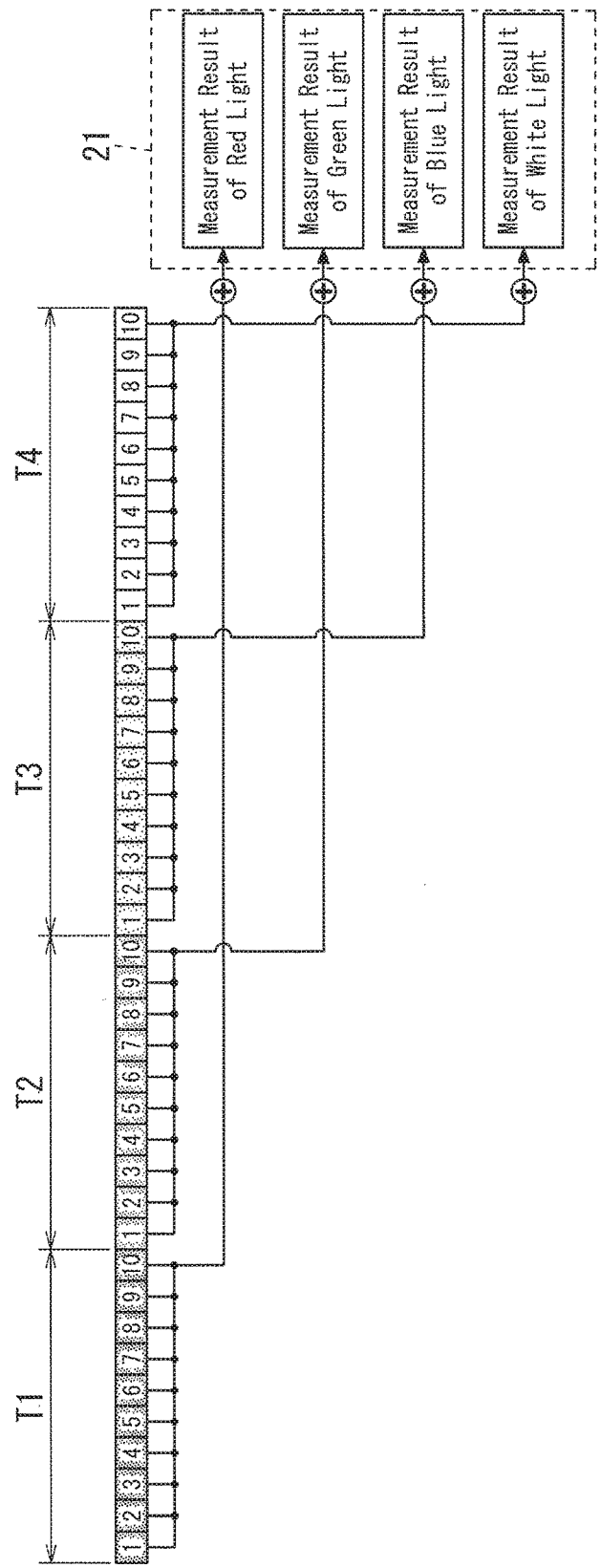
FIG. 4 is an explanatory diagram of the determination results

The sensor 2 is configured to output measurement values obtained by individually measuring a light intensity of the first light source 1f in the first time period and a light intensity of the second light source 1s in the first time period. In other words, the sensor 2 is configured to output a measurement value obtained by measuring a light intensity of one type of light sources 1a in the single color time period. As shown in FIG. 4, the controller circuit 3 controls individual lighting states of the first light source 1f and the second light source 1s, based on the measurement results corresponding to values each derived from measurement values obtained by performing measurement a predetermined number of times, so that light intensities of the light sources 1a fall within a desired range. In summary, the controller circuit 3 controls individual lighting states of the two or more types of light sources 1a, based on the measurement results, so that light intensities of the light sources 1a fall within a desired range.

In FIG. 4, as to the first single color time period T1 for allowing only the red LED 1a1 to emit light in one cycle, the sensor 2 measures a light intensity of red light ten times to obtain ten measurement values, and thus a measurement result indicates a sum of the obtained ten measurement values. In FIG. 4, the mixed color time period in each cycle is not illustrated. Similarly, as to the second single color time period T2 for allowing only the green LED 1a2 to emit light in one cycle, the sensor 2 measures a light intensity of green light ten times to obtain ten measurement values, and thus a measurement result indicates a sum of the obtained ten measurement values. As to the third single color time period T3 for allowing only the blue LED 1a3 to emit light in one cycle, the sensor 2 measures a light intensity of blue light ten times to obtain ten measurement values, and thus a measurement result indicates a sum of the obtained ten measurement values. As to the fourth single color time period T4 for allowing only the white LED 1a4 to emit light in one cycle, the sensor 2 measures a light intensity of white light ten times to obtain ten measurement values, and thus a measurement result indicates a sum of the obtained ten measurement values. In the lighting system 20 of the present embodiment, the measurement result corresponding to the measurement value means a measurement result corresponding to the sum of measurement values calculated by integration. Examples of the measurement result corresponding to the measurement value may include an average of measurement values obtained by multiple time measurement, in addition to the sum of measurement values.

In the lighting system 20, the controller circuit 3 controls individual lighting states of the multiple light sources 1a based on the measurement result corresponding to values calculated from the measurement values obtained by performing measurement a predetermined number of times for example, the measurement value of the sensor 2 of the replacement lighting device 10 and the one or more measurement values of the one or more sensors 2 of the one or more remaining lighting devices 10), thereby reducing differences between the light intensities of the two or more lighting devices 10.

In other words, in the lighting system 20 of the present embodiment, the light sources 1a include the first light source 1f and the second light source 1s. The controller circuit 3 repeats the cycles multiple times, and the cycle is defied as a set of the first time period and the second time period. In the first time period, the controller circuit 3 controls a light source which is either the first light source 1f or the second light source 1s, to emit light, so as to allow the sensor 2 to measure a light intensity of this light. In the second time period, the controller circuit 3 controls both the first light source 1f and the second light source 1s to emit light. The controller circuit 3 controls lighting state of the at least one light source 1a so that mixed light of light from the first light source 1f and light from the second light source 1s has a same light intensity for each cycle. The sensor 2 outputs measurement values obtained by individually measuring a light intensity of the first light source 1f in the first time period and a light intensity of the second light source 1s in the first time period. The controller circuit 3 may be preferably configured to individually control lighting states of the first light source 1f and the second light source 1s.

In the lighting system 20 of the present embodiment, the controller circuit 3 individually controls the lighting states of the first light source 1f and the second light source 1s, and therefore it is possible to more reduce differences between the lighting intensities of the two or more lighting devices 10. In the lighting system 20 of the present embodiment, the controller circuit 3 individually controls the lighting states of the first light source 1f and the second light source 1s, and therefore it is possible to reduce differences in luminance and color between the two or more lighting devices 10.

Hereinafter, components included in the lighting system 20 of the present embodiment are described in more detail.

As shown in FIG. 1, the controller circuit 3 of the lighting device 10 includes a drive controller circuit 3a, a lighting circuit 3b, a communication circuit 3c, and a driving power supply 3d.

The drive controller circuit 3a is configured to output a control signal for controlling the lighting circuit 3b. Examples of the control signal may include a PWM (Pulse Width Modulation) signal according to a duty cycle. The drive controller circuit 3a turns on and off a switching device in the lighting circuit 3b by the PWM signal to allow a predetermined current to flow through the light source 1a. The drive controller circuit 3a is configured to individually control outputs of two types of light sources 1a with different emission colors. In other words, the drive controller circuit 3a is configured to individually change light outputs of the red LED 1a1, the green LED 1a2, the blue LED 1a3, and the white LED 1a4. The drive controller circuit 3a is electrically connected to the sensor 2. The drive controller circuit 3a obtains a light intensity of red light, a light intensity of green light, and a light intensity of blue light, individually, based on measurement values outputted from the sensor 2.

The drive controller circuit 3a may be configured to control a phase difference defining a difference between a timing of allowing only the light source 1a of which the light intensity is to be measured by the sensor 2 to start emitting light, and a timing of allowing the remaining light sources 1a to emit light in one cycle. The controller circuit 3 may increase the phase difference gradually with an increase in the number of times of two or more cycles. In contrast to configuration of control of keeping the phase difference constant, the controller circuit 3 performs control of gradually increasing the phase difference and thus can suppress flickers of light emitted from the lighting device 10.

In a case where the drive controller circuit 3a controls the phase difference in one cycle, the sensor 2 may preferably measure the light intensity of the light source 1a as a measurement target in the first time period of the cycle corresponding to the maximum phase difference. When the sensor 2 measures the light intensity of the light source 1a in the first time period of the cycle corresponding to the maximum phase difference, the measurement sensitivity can be easily increased.

It is preferable that the sensor 2 does not measure the light intensity of the light source 1a as a measurement target in case where a lighting time period of the light source 1a as the measurement target in the first time period is shorter than a predetermined measurement time period for measurement of the measurement value. In the lighting system 20, when the sensor 2 does not measure the light intensity of the light source 1a as the measurement target in a case where the lighting time period of the light source 1a as the measurement target in the first time period is shorter than the predetermined measurement time period for measurement of the measurement value, the measurement sensitivity can be more easily increased.

For example, the lighting system 20 may measure the light intensity of one type of light source 1a one time in the single color time period in one cycle, and control the lighting state of the light source 1a based on a representative measurement value which is the sum of measurement values obtained in the single color time periods in successive cycles.

The drive controller circuit 3a is realized by a microcomputer including a CPU (Central Processing Unit), for example. The microcomputer can perform predetermined control operations by executing appropriate programs stored in a built-in memory 3a1. The memory 3a1 may include an electrically rewritable non-volatile semiconductor memory. Examples of the non-volatile semiconductor memory may include a flash memory and an EEPROM (Electrically Erasable and Programmable Read Only Memory). The memory 3a1 may store a correction coefficient for correcting the light output of the light source 1a. Examples of the correction coefficient may include a correction value for modifying a pulse width (on period) of a PWM signal so that a light intensity of a light source 1a measured by the sensor 2 is equal to a desired light intensity. In the lighting device 10, controls on the lighting states of the light source 1a and light intensity measurement of the sensor 2 can be appropriately modified by appropriately modifying programs stored in the memory 3a1 of the drive controller circuit 3a.

The lighting circuit 3b is configured to adjust the light outputs of the light sources 1a. The lighting circuit 3b includes a first lighting circuit 3b1, a second lighting circuit 3b2, a third lighting circuit 3b3, and a fourth lighting circuit 3b4. The first lighting circuit 3b1 is configured to control the lighting state of the red LED 1a1. The second lighting circuit 3b2 is configured to control the lighting state of the green LED 1a2. The third lighting circuit 3b3 is configured to control the lighting state of the blue LED 1a3. The fourth lighting circuit 3b4 is configured to control the lighting state of the white LED 1a4. The first lighting circuit 3b1, the second lighting circuit 3b2, the third lighting circuit 3b3, and the fourth lighting circuit 3b4 have the same or similar configuration basically. The lighting device 10 is configured to produce mixed light with a desired color by supplying power to the red LED 1a1, the green LED 1a2, the blue LED 1a3, and the white LED 1a4 from the lighting circuit 3b. The lighting device 10 can emit white color by adjusting a ratio of the light outputs of the red LED 1a1, the green LED 1a2, and the blue LED 1a3. Hereinafter, the configuration of the first lighting circuit 3b1 is mainly described.

The first lighting circuit 3b1 includes a step-down chopper circuit, and a drive circuit. The step-down chopper circuit includes a switching device. The drive circuit is configured to turn on and off the switching device. In the first lighting circuit 3b1, the step-down chopper circuit and the drive circuit constitute a switching power supply. The first lighting circuit 3b1 decreases a DC voltage from the external power supply 22 to a driving voltage suitable for a series circuit of a plurality of red LEDs 1a1 constituting the light source 1a. The first lighting circuit 3b1 can change the light outputs of the red LEDs 1a1 according to the duty cycle defined as a ratio of an on period to a switching cycle of the switching device. The first lighting circuit 3b1 collectively controls the plurality of red LEDs 1a1 connected in series.

The communication circuit 3c is configured to bidirectionally communicate with the control device 21 provided outside the lighting device 10. The communication circuit 3c is electrically connected to the control device 21 via an electric cable serving as a communication medium. The communication circuit 3c may not be electrically connected to the control device 21 via an electric cable serving as a communication medium. The communication circuit 3c may be configured to communicate with the control device 21 in a wireless manner. The communication circuit 3c is configured to send a corresponding one of unique identifiers (for example, unique addresses individually allocated to the two or more lighting devices 10 and an indication signal to the control device 21 at the time of the first communication with the control device 21. The indication signal is a signal for providing information for distinguishing the replacement lighting device 10 from the two or more lighting devices 10, to the control device 21. The communication circuit 3c is configured to send the measurement value obtained by the sensor 2 together with the unique address to the control device 21 in response to a request from the control device 21. The communication circuit 3c is configured to receive information for generating the correction coefficient from the control device 21. The communication circuit 3c may include an RS-485 transceiver, for example. The RS-485 transceiver sends and receives RS-485 signals in conformity with telecommunications standard of Electronic Industries Association. Note that, the correction coefficient may be used for correcting the color of light emitted from the lighting device 10 and reducing differences between the light intensities of the two or more lighting devices 10.

The driving power supply 3d is configured to supply driving power to the drive controller circuit 3a, the lighting circuit 3b, and the communication circuit 3c. The driving power supply 3d is configured to supply predetermined driving power by dividing a voltage of power supplied from the external power supply 22 by use of a series circuit of two resistors.

The control device 21 has a function of calculating a sum of measurement values sent from each of the two or more lighting devices 10. The control device 21 is configured to send, as the information for generating the correction coefficient, the measurement result corresponding to the sum of the measurement values obtained by the sensor 2 of each of the two or more lighting devices 10, to a corresponding one of the two or more lighting devices 10. The control device 21 can be realized by a computer including appropriate software and hardware operating according to the software. For example, by executing the software such as programs by the hardware such as processors, the control device 21 performs predetermined operations such as individual control of the two or more lighting devices 10.

The control device 21 includes a history detector circuit 21b in addition to the replacement detector circuit 21a. The history detector circuit 21b includes a timer for measuring total lighting time of each of the two or more lighting devices 10. The timer is realized by a timer counter built in the computer. The history detector circuit 21b measures, as the total lighting time of the lighting device 10, elapsed time from lighting start time at which the controller circuit 3 provides a command to the lighting device 10 to light the light source 1a first in the lighting system 20. The replacement detector circuit 21a distinguishes the replacement lighting device 10 from the one or more remaining lighting devices 10 of the two or more lighting devices 10, based on lengths of the total lighting time of the two or more lighting devices 10. The replacement detector circuit 21a can determine a replacement history indicating when each of the two or more lighting devices 10 was replaced, by setting the total lighting time for each predetermined range.

Figure 5:
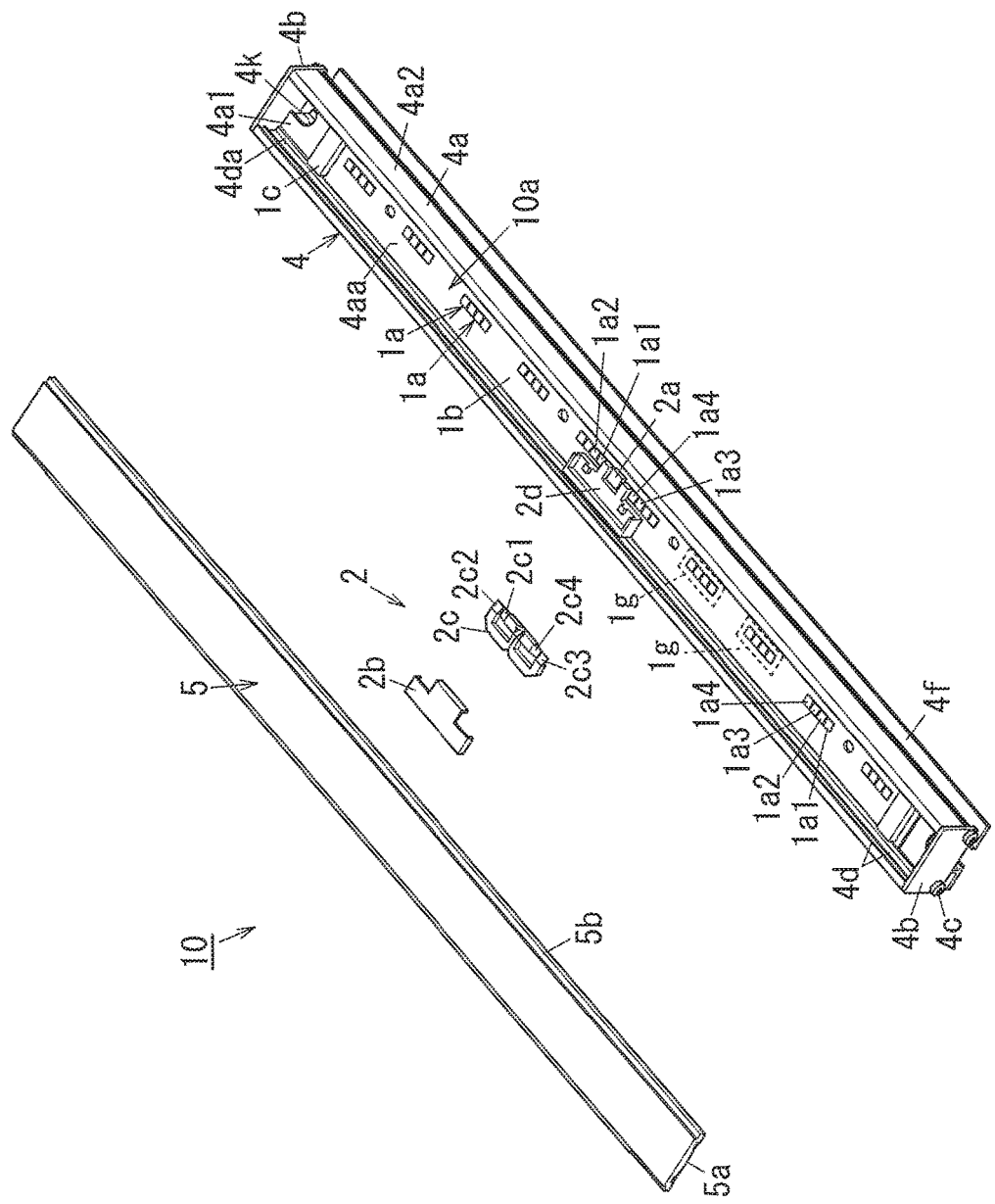
FIG. 5 is an exploded perspective view of the lighting device included in the above lighting system.
Figure 6:
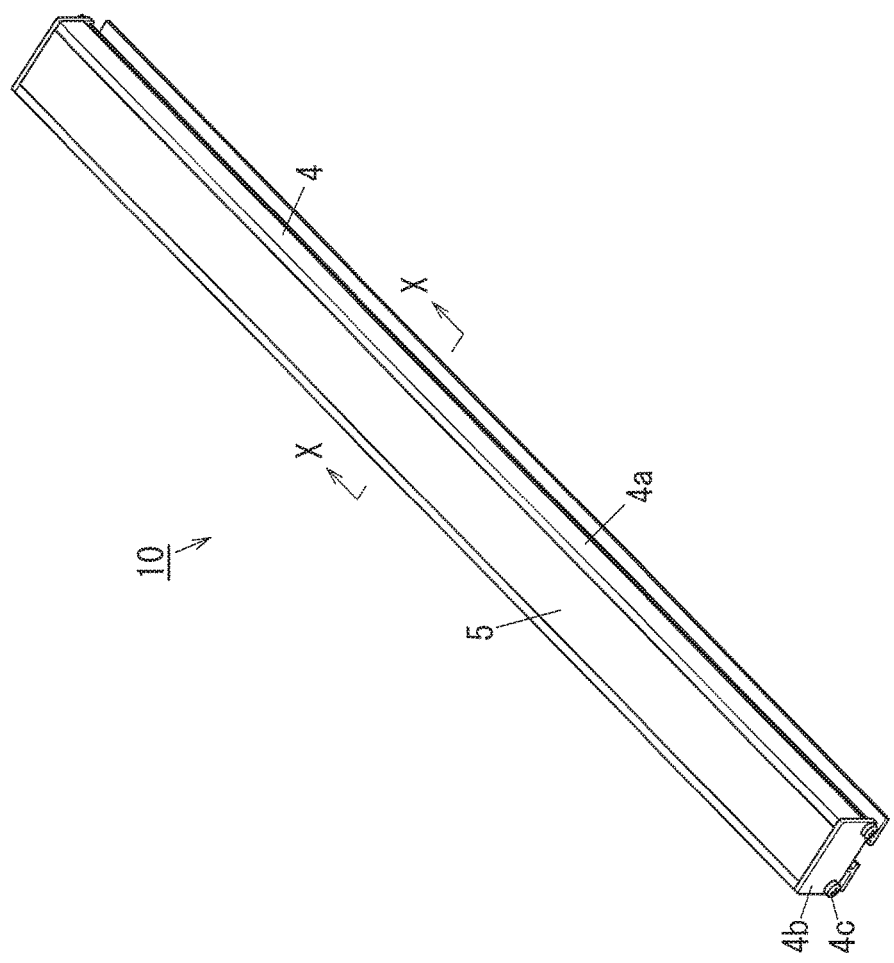
FIG. 6 is a perspective view of the lighting device included in the above lighting system.
Figure 7:
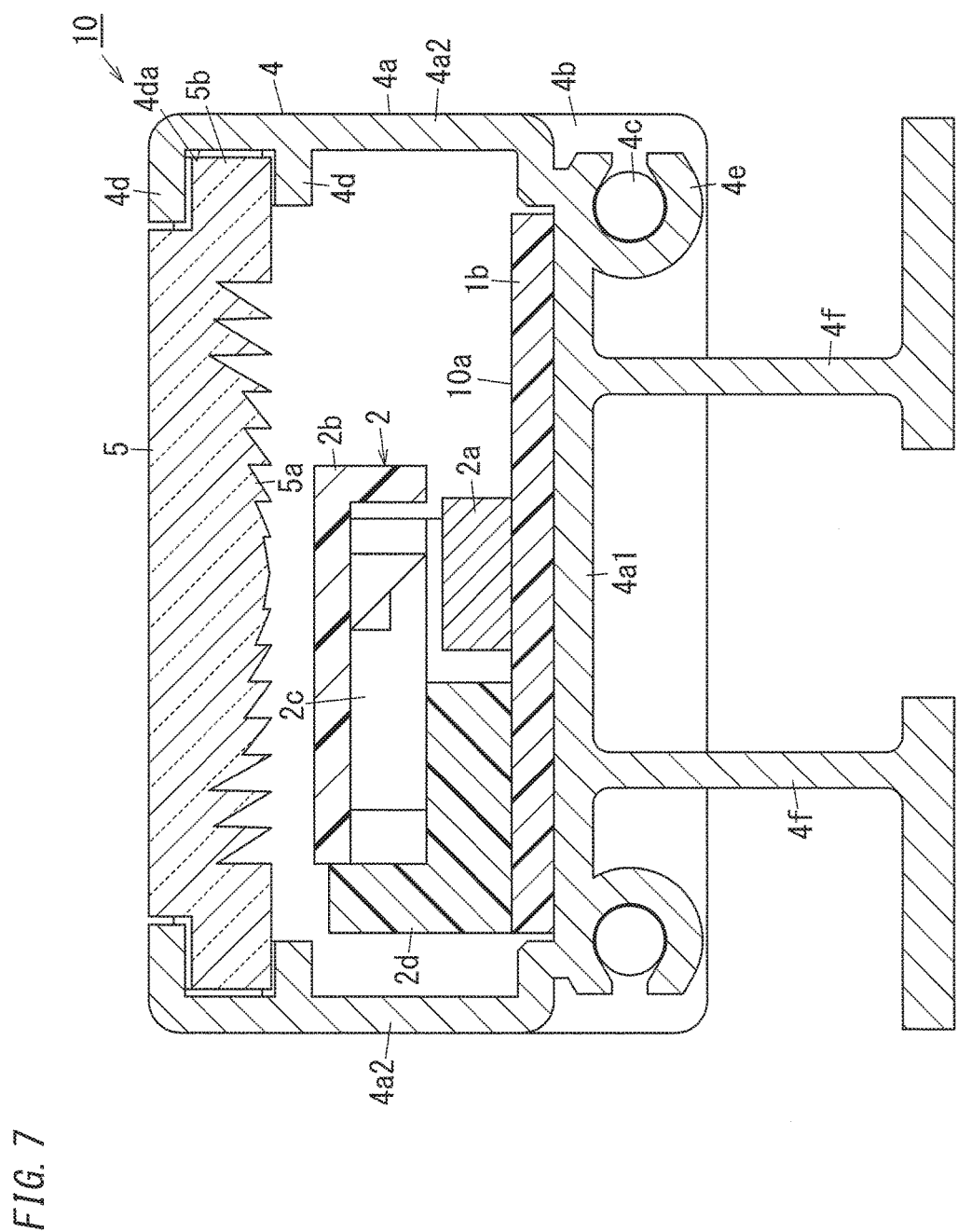
FIG. 7 is a section along X-X of FIG. 6.

The lighting device 10 includes the light sources 1a, the sensor 2, and the controller circuit 3 as shown in FIG. 1, and further includes a casing 4 and an optical member 5 as shown in FIG. 5 to FIG. 7. The light sources 1a, the sensor 2, and the controller circuit 3 are fixed to a mounting substrate 1b to form a part of the light source unit 10a. FIG. 5 to FIG. 7 do not illustrate the controller circuit 3.

In the lighting device 10, as shown in FIG. 5, there are multiple LED groups 1g mounted on the elongated mounting substrate 1b. Each of the multiple LED groups 1g group of four types of light sources 1a with mutually different colors. The LED group 1g includes, as the four types of light sources 1a with mutually different colors, each one of the red LED 1a1, the green LED 1a2, the blue LED 1a3, and the white LED 1a4. The four types of LEDs are arranged in line along the lengthwise direction of the mounting substrate 1b at a center in the width direction of the mounting substrate 1b. In each LED group 1g, the four types of LEDs are arranged at almost regular intervals. The multiple LED groups 1g are arranged at predetermined intervals. The multiple LEDs may not be limited to being arranged in line. In each LED group 1g, the multiple LEDs may be arranged in a particular pattern other than a straight pattern. For example, four LEDs may be arranged in a 2 by 2 matrix manner.

The two or more types of light sources 1a with mutually different colors are not limited to the four types of LEDs which are the red LED 1a1, the green LED 1a2, the blue LED 1a3, and the white LED 1a4. The two or more types of light sources 1a with mutually different colors may be three types of LEDs which are a cyan LED for emitting cyan light, a magenta LED for emitting magenta light, and a yellow LED for emitting yellow light.

For example, such an LED may include an LED chip, a package including a recess for accommodating the LED chip, and a light transmissive sealant filling the recess. Such an LED may be a surface mounting light emitting diode including an LED chip, a package, and a sealant, an LED chip only, for example. In the lighting device 10 according to the present embodiment, LEDs preliminarily categorized in the same color rank are used in order that LEDs with the same emission color can emit light with the almost same colors when supplied with the same current. In the lighting device 10, LEDs categorized in the same rank are used for each emission color. In one lighting device 10, colors are uniformed for each emission color of LEDs. The light sources 1a are not limited to two or more types of light sources with mutually different colors. The light sources 1a may be multiple LEDs with the same emission color. As for the light source 1a, light sources with the same emission color constitute each of groups, and the light sources can be operated for each group. For example, the lighting system 20 may be configured to include all light sources 1a with the same emission color. Examples of the light source 1a may include an LED for emitting light with a daylight color, an LED for emitting light with a white color, an LED for emitting light with a neutral color, an LED for emitting light with a warm white color, and an LED for emitting light with an incandescent color, and such colors are specified by JIS Z 9112. Examples of the light source 1a are not limited to LEDs specified by JIS Z 9112. Examples of the light source 1a may include LEDs having light colors specified by ANSI C 78.377.

The light source 1a is not limited to configuration including an LED. The light source 1a may have configuration including an organic EL element or a discharge lamp such as fluorescent lamp, instead of an LED.

The mounting substrate 1b has an outer shape of a rectangular flat plate. The mounting substrate 1b is a glass epoxy resin substrate. Examples of the mounting substrate 1b are not limited to a glass epoxy resin substrate. Examples of the mounting substrate 1b may include a metal substrate on which a wiring conductor with a predetermined shape is provided with an insulating layer in-between. LEDs with mutually different emission colors are mounted on the mounting substrate 1b. Of those, LEDs with the same emission color are electrically connected in series with each other by a wiring conductor with a predetermined shape so that LEDs can be turned on for each emission color. The mounting substrate 1b is provided with a connector 1c for supplying power to LEDs for each emission color. One or more LEDs can have the same emission color.

The sensor 2 is configured to measure a light intensity of one or more LEDs for each of mutual different emission colors. The sensor 2 is provided to the mounting substrate 1b. The sensor 2 incudes, as shown in FIG. 5 and FIG. 7, a sensing element 2a, a first cover 2d, a light guide 2c, and a second cover 2b.

The sensing element 2a is mounted on the mounting substrate 1b. The sensing element 2a includes one or more photodiodes each associated with an optical filter. The sensing element 2a includes at least three photodiodes. The three photodiodes are associated with mutually different optical filters. The optical filters transmit light with mutually different colors. For example, the mutually different optical filters transmit red light, green light, and blue light, respectively.

The sensing element 2a can measure light intensities of the light sources 1a with mutually different emission colors with the three photodiodes associated with the optical filters of mutually different colors. The sensing element 2a converts light emitted from a light source 1a into an electric signal and outputs the converted electric signal. The sensing element 2a is configured to be sensitive to each of red light, green light, and blue light, and output a measurement value represented by a digital value of 16 bits for each color. The sensing element 2a can output measurement values of the light intensity of red light, the light intensity of green light, and the light intensity of blue light, by serial data. Examples of the sensing element 2a may include a color sensor in conformity with an I2C (Inter-Integrated Circuit) interface.

The first cover 2d is attached to the mounting substrate 1b. The first cover 2d is designed to hold the light guide 2c. The first cover 2d is placed in vicinities of the light source 1a and the sensing element 2a. The first cover 2d is made of resin material such as epoxy resin, for example. The first cover 2d may be preferably made of black resin. In the case of the first cover 2d being made of black resin, light from a light source 1a passing through the light guide 2c can be suppressed from being influenced by external light and reflection light reflected at the mounting substrate 1b.

The light guide 2c is deigned to be accommodated in a recess of the first cover 2d. The light guide 2c is designed to guide light from the light sources 1a with mutually different emission colors mounted on the mounting substrate 1b, to the sensing element 2a.

The light guide 2c includes, as shown in FIG. 5, a first light receiver 2c1, a second light receiver 2c2, a third light receiver 2c3, and a fourth light receiver 2c4. The first light receiver 2c1 is provided to face the red LED 1a1. The second light receiver 2c2 is provided to face the green. LED 1a2. The third light receiver 2c3 is provided to face the blue LED 1a3. The fourth light receiver 2c4 is provided to face the white LED 1a4. The light guide 2c is designed to direct red light entering it via the first light receiver 2c1, to a light receiving surface of the sensing element 2a. The light guide 2c is designed to direct green light entering it via the second light receiver 2c2, to the light receiving surface of the sensing element 2a. The light guide 2c is designed to direct blue light entering it via the third light receiver 2c3, to the light receiving surface of the sensing element 2a. The light guide 2c is designed to direct white light entering it via the fourth light receiver 2c4, to the light receiving surface of the sensing element 2a. The light guide 2c is made of acrylic resin. The light guide 2c may not be made of acrylic resin. The light guide 2c may be made of light transmissive resin such as polycarbonate resin. The light guide 2c may be made of not only light transmissive resin but also glass. The light guide 2c is formed to have an appropriate shape. The second cover 2b is provided to cover the light guide 2c. The second cover 2b may be made of structural material such as epoxy resin, for example. The second cover 2b may be made of black resin. In the case of the second cover 2b being made of black resin, light from a light source 1a passing through the light guide 2c can be suppressed from being influenced by external light.

The casing 4 includes, as shown in FIG. 5 to FIG. 7, a body 4a, end surface plates 4b, and fixing screws 4c. The casing 4 has an elongated outer shape. The casing 4 is designed to hold the light source unit 10a and the optical member 5.

The body 4a includes a bottom plate 4a1, and side plates 4a2. The bottom plate 4a1 has a rectangular outer shape in a plan view. The bottom plate 4a1 includes cutouts 4k. The cutouts 4k are individually provided to opposite ends in the length direction of the bottom plate 4a1. The side plates 4a2 extend along the length direction of the bottom plate 4a1 and protrude in the thickness direction of the bottom plate 4a1 from individual opposite ends in the width direction of the bottom plate 4a1. The pair of side plates 4a2 are positioned facing each other. A pair of ribs 4d is provided to at front end of each side plate 4a2 opposite from the bottom plate 4a1. The ribs 4d are provided to protrude toward the inside of the casing 4 along the thickness direction of the corresponding side plate 4a2 from the front end of the corresponding side plate 4a2. The ribs 4d are provided to extend along the length direction of the casing 4. Each pair of ribs 4d forms a groove 4da therebetween. When opposite ends in the width direction of the optical member 5 are inserted into the grooves 4da, the optical member 5 are held by each pair of ribs 4d. In a section perpendicular to the lengthwise direction of the body 4a, as shown in FIG. 5 and FIG. 7, the bottom plate 4a1 and the pair of side plates 4a2 show an outer shape like a C-shape. The opposite ends in the lengthwise direction of the body 4a individually include openings, and the end surface plates 4b with flat plate shapes are provided thereto to cover the openings.

The casing 4 includes an opening 4aa. The opening 4aa is provided to be surrounded by the bottom plate 4a1, the pair of side plates 4a2, and the pair of end surface plates 4b. The casing 4 is designed so that the opening 4aa is covered with the optical member 5. The casing 4 is designed to accommodate the light source unit 10a inside. The casing 4 is designed so that the light source unit 10a is fixed to the bottom plate 4a1 by screwing, for example.

The body 4a includes, as shown in FIG. 7, screw-holders 4e. The screw-holder 4e has an outer shape like a C-shape in a section. The screw-holders 4e are provided to a rear side of the bottom plate 4a1 opposite from a front side where the side plates 4a2 protrude. The screw-holder 4e is designed to receive the fixing screws 4c inserted through the end surface plates 4b. In other words, the end surface plates 4b are fixed to the screw-holders 4e of the body 4a with the fixing screws 4c. The body 4a includes a pair of legs 4f. The pair of legs 4f are provided to extend in the lengthwise direction of the body 4a. Each leg 4f has an outer shape like an L-shape in a section perpendicular to the lengthwise direction. Each leg 4f protrudes in the thickness direction of the bottom plate 4a1 of the body 4a so as to be away from the bottom plate 4a1. Front ends of the pair of legs 4f are designed to protrude away from each other. Each leg 4f may include one or more through holes in order to fix the lighting device 10 to a holder by one or more screws.

The optical member 5 is designed to transmit light from at least one light source 1a. The optical member 5 is made of light transmissive material. Examples of the light transmissive material may include acrylic resin, epoxy resin, and glass. The optical member 5 includes a lens 5a on a surface facing the at least one light source 1a. The lens 5a is designed to transmit light from the at least one light source 1a to the outside of the casing 4 to show predetermined light distribution properties. Examples of the lens 5a may include a Fresnel lens. The optical member 5 is a flat plate with an elongated outer shape. The optical member 5 includes a pair of flanges 5b at opposite ends in the width direction of the optical member 5, and the pair of flanges 5b extend along the lengthwise direction of the optical member 5. The pair of flanges 5b are provided to protrude outward from the opposite ends in the width direction of the optical member 5, individually. By sliding the optical member 5, the flanges 5b can be inserted into the grooves 4da formed by the pairs of ribs 4d extending along the lengthwise direction of the body 4a. The optical member 5 is designed to be detachably attached to the body 4a.

Hereinafter, operations of the lighting system 20 of the present embodiment are described with reference to FIG. 2A, FIG. 2B, and FIG. 2C.

In the lighting system, in the case of supplying the same amount of power, a light intensity of at least one lighting device of the two or more lighting devices may greatly decrease compared with one or more remaining lighting devices of the two or more lighting devices due to malfunction of the at least one lighting device, deterioration of the at least one lighting device, or the like. In the lighting system, a lighting device which is one of the two or more lighting devices but may be not working may be replaced with a replacement lighting device. The replacement lighting device tends to show a higher light intensity than the one or more remaining lighting devices because the replacement lighting device deteriorates less than the one or more remaining lighting devices.

FIG. 2A shows the lighting system 20 under a condition where the total lighting time from the time at which the lighting devices 10 are turned on first time is equal to or longer than 10,000 hours. In the lighting system 20, the first lighting device 10A may have a light intensity of 82%, the second lighting device 10B may have a light intensity of 0%, the third lighting device 10C may have a light intensity of 78%, and the fourth lighting device 10D may have a light intensity of 80%. Each light intensity of the lighting device 10 is represented by a proportion of the light intensity after a lapse of 10,000 hours from the lighting start time of the lighting device 10, to the initial light intensity of the lighting device 10 which is treated as 100%. In FIG. 2A, mark "X" is superimposed on the second lighting device 10B which is required to be replaced due to malfunction.

FIG. 2B shows a situation where the second lighting device 10B shown in FIG. 2A has been replaced with the fifth lighting device 10E. In the lighting system 20, for example, when the fifth lighting device 10E is activated first time after replacement, the fifth lighting device 10E sends its unique address and the indication signal to the control device 21 via the communication circuit 3c. In the lighting system 20, the control device 21 receives the indication signals together with the unique addresses each time the system is activated. Based on the indication signals, the history detector circuit 21b records the total lighting time of the fifth lighting device 10E instead of that of the second lighting device 10B. The replacement detector circuit 21a distinguishes the replacement lighting device 10 of the two or more lighting devices 10 from the one or more remaining lighting devices 10, based on the indication signals. In other words, in the lighting system 20 of the present embodiment, the replacement lighting device 10 is distinguished from the one or more remaining lighting devices 10 in both of before and after activation of the system. When detecting the replacement lighting device 10, the lighting system 20 measures the light intensities of all of the two or more lighting devices 10. The control device 21 outputs command signals for measuring light intensities of light sources 1a to all of the lighting devices 10, in order to measure the light intensities of all of the first lighting device 10A, the fifth lighting device 10E, the third lighting device 10C, and the fourth lighting device 10D. The lighting system 20 measures the light intensities of the light sources 1a of all of the replacement fifth lighting device 10E, the first lighting device 10A, the third lighting device 10C, and the fourth lighting device 10D which are not replaced, with the sensors 2 of the lighting devices 10. In more detail, in the lighting system 20, in each of all of the first lighting device 10A, the fifth lighting device 10E, the third lighting device 10C, and the fourth lighting device 10D, the sensor 2 measures a light intensity for each of two or more types of light sources 1a with different emission colors in response to the command signal from the control device 21. The control device 21 is configured to obtain the measurement value indicative of the light intensity of the light source 1a measured by the sensor 2 of the lighting device 10. In FIG. 2B, outline arrows indicate transmission of data on measurement values obtained by the two or more lighting devices 10 to the control device 21.

The control device 21 obtains the measurement results indicating that the light intensity of the first lighting device 10A is 82%, the light intensity of the fifth lighting device 10E is 100%, the light intensity of the third lighting device 10C is 78%, and the light intensity of the fourth lighting device 10D is 80%. In the lighting system 20, the total lighting time of the replacement fifth lighting device 10E is 0 hour, and the light intensity of 100% is obtained from the fifth lighting device 10E.

FIG. 2C shows that the lighting system 20 performs control of adjusting the light intensity of the fifth lighting device 10E to an average of the light intensities of the first lighting device 10A, the third lighting device 10C, and the fourth lighting device 10D which are not replaced. For example, the control device 21 calculates the average light intensity of 80% of the first lighting device 10A, the third lighting device 10C, and the fourth lighting device 10D which have not been replaced. The control device 21 calculates the correction coefficients for correcting the lighting states of the light sources 1a of the fifth lighting device 10E so as to reduce differences between the light intensities of the light sources 1a in the first lighting device 10A, the fifth lighting device 10E, the third lighting device 10C, and the fourth lighting device 10D. The control device 21 sends the measurement result determined by use of the calculated correction coefficients to the fifth lighting device 10E. Calculation of the correction coefficients may not be done by the control device 21 only. The drive controller circuits 3a of the individual lighting devices 10 may calculate the correction coefficients. The control device 21 sends, to the fifth lighting device 10E, the correction data including the correction coefficients for correcting the dimming signals so that the light intensity of the fifth lighting device 10E is equal to 80%.

The fifth lighting device 10E controls the lighting states of the light sources 1a based on the measurement result. To emit light with a color based on the dimming signal given by the control device 21, the fifth lighting device 10E corrects the present dimming signals by use of the correction coefficient In the fifth lighting device 10E, the controller circuit 3 multiplies values of the current dimming signals with the correction coefficients, thereby controlling the lighting state of the light source 1a with the PWM signal corresponding to the corrected duty cycle for each of different emission color types of light sources 1a.

The lighting system 20 corrects the light intensities of the light sources 1a of the fifth lighting device 10E so as to be equal to the average of the light intensities of the first lighting device 10A, the third lighting device 10C, and the fourth lighting device 10D, thereby reducing the differences between the light intensities of the two or more lighting devices 10.

The lighting system 20 controls the replacement fifth lighting device 10E to have the light intensity equal to the average of the light intensities of the one or more remaining lighting devices 10. Thereby, the differences between the light intensities of the two or more lighting devices 10 can be reduced. In FIG. 2C, a black arrow indicates the correction data sent from the control device 21 to the lighting device 10.

In the lighting system 20 of the present embodiment, each of the two or more lighting devices 10 further includes the communication circuit 3c configured to communicate with the control device 21. The communication circuit 3c may be preferably configured to send the indication signal indicative of information for identifying the replacement lighting device 10, to the control device 21.

In the lighting system 20 of the present embodiment, the communication circuit 3c sends the indication signal to the control device 21, and therefore it is possible to relatively easily detect replacement of the lighting device 10.

In the lighting system 20 of the present embodiment, the control device 21 includes the history detector circuit 21b. The history detector circuit 21b includes a timer for measuring the total lighting time of each of the two or more lighting devices 10. The replacement detector circuit 21a may be configured to distinguish the replacement lighting device 10 from the one or more remaining lighting devices 10 of the two or more lighting devices 10, based on lengths of the total lighting time measured by the history detector circuit 21b.

The lighting system 20 of the present embodiment distinguishes the replacement lighting device 10 from the one or more remaining lighting devices 10, based on lengths of the total lighting time measured by the history detector circuit 21b. Therefore, it can be relatively easy to reduce differences between the light intensities of the lighting devices 10.

The lighting system 20 may not be configured to adjust the light intensity of the replacement fifth lighting device 10E to the average of the light intensities of the first lighting device 10A, the third lighting device 10C, and the fourth lighting device 10D which have not been replaced. The lighting system 20 may control all of the lighting devices 10 so that the light intensities of all of the lighting devices 10 are equal to the average of the light intensities of the one or more remaining lighting devices 10 (the desired light intensity in this example).

For example, in FIG. 2C, when the first lighting device 10A has the light intensity of 82% before correction, the lighting system 20 peforms correction to decrease the light intensity so that the first lighting device 10A has the light intensity of 80% after correction. For example, when the fifth lighting device 10E has the light intensity of 100% before correction, the lighting system 20 peforms correction to decrease the light intensity so that the fifth lighting device 10E has the light intensity of 80% after correction. For example, when the third lighting device 10C has the light intensity of 78% before correction, the lighting system 20 peforms correction to increase the light intensity so that the third lighting device 10C has the light intensity of 80% after correction. For example, when the fourth lighting device 10D has the light intensity of 80% before correction, the lighting system 20 does not perform correction and thereby allows the fourth lighting device 10D to maintain the light intensity of 80%. The lighting system 20 controls the light intensities of all of the lighting devices 10 so that the light intensities of all of the lighting devices 10 are equal to 80% which is the average of the light intensities of the one or more remaining lighting devices 10. Therefore, the differences between the light intensities of the two or more lighting devices 10 can be more reduced.

The lighting system 20 may not be configured to control all of the lighting devices 10 so that the light intensities of all of the lighting devices 10 are equal to the average of the light intensities of the one or more remaining lighting devices 10. The lighting system 20 may control all of the lighting devices 10 so that the light intensity of the replacement fifth lighting device 10E is equal to the light intensity of the third lighting device 10C which is the lowest of the light intentisties of the one or more remaining lighting devices 10 (the desired light intensity in this example).

For example, in FIG. 2C, when the first lighting device 10A has the light intensity of 82% before correction, the lighting system 20 peforms correction to decrease the light intensity so that the first lighting device 10A has the light intensity of 78% after correction. For example, when the fifth lighting device 10E has the light intensity of 100% before correction, the lighting system 20 peforms correction to decrease the light intensity so that the fifth lighting device 10E has the light intensity of 78% after correction. For example, when the third lighting device 10C has the light intensity of 78% before correction, the lighting system 20 does not perform correction and thereby allows the third lighting device 10C to maintain the light intensity of 78%. For example, when the fourth lighting device 10D has the light intensity of 80% before correction, the lighting system 20 performs correction to decrease the light intensity so that the fourth lighting device 10D has the light intensity of 78%. The lighting system 20 controls all of the lighting devices 10 so that the light intensities of all of the lighting devices 10 are equal to the light intensity of 78% of the lighting device 10 which is the lowest of the light intensities of the one or more remaining lighting devices 10. Therefore, the differences between the light intensities of the two or more lighting devices 10 can be more reduced.

The lighting system 20 may control a light intensity of at least one lighting device 10 so as to be equal to the average of the light intensities of the one or more remaining lighting devices 10 or the light intensity of the lighting device 10 which is the lowest of the light intentisties of the one or more remaining lighting devices 10. Consequently, it is possible to suppress an increase with time in power consumption of the lighting device 10.

The lighting system 20 may not adjust the light intensities of all of the lighting devices 10 to the light intensity of the lighting device 10 which is the lowest of the light intentisties of the one or more remaining lighting devices 10. The lighting system 20 may control the light intensities of the remaining first lighting device 10A, third lighting device 10C, and fourth lighting device 10D so as to be equal to the highest one of the light intensities of the two or more lighting devices 10 (the desired light intensity in this example), that is, the light intensity of the replacement fifth lighting device 10E in almost cases.

In the lighting system 20, each of the two or more lighting devices 10 may further include a temperature sensor. When the lighting system 20 controls the light intensities of all of the lighting devices 10 to be equal to the highest one of the light intensities of the two or more lighting devices 10, the lighting system 20 may have a function of turning off a lighting device 10 based on a command from a temperature sensor before a temperature of an LED reaches a predetermined value. When the lighting system 20 has the function of turning off a lighting device 10 in response to a command from the temperature sensor, it is possible to suppress damages caused by an increase in power consumption of a lighting device 10. When the lighting system 20 control the light intensities of all of the lighting devices 10 so as to be equal to the highest one of the light intensities of the two or more lighting devices 10, the lighting system 20 may have a function of announcing necessity of replacement of a lighting device 10 before a temperature of an LED reaches a predetermined value, in response to a command from the temperature sensor. For example, in the announcing function, the lighting device 10 required to be replaced may be controlled to blink light from the at least one light source 1a thereof blinks. For example, in the announcing function, the lighting device 10 required to be replaced may be controlled to dim the at least one light source 1a thereof. The announcing function can be realized by use of a computer functioning as the control device 21, for example.

A mobile object 30 of the present embodiment includes the lighting system 20 shown in FIG. 1.

The mobile object 30 includes the lighting system 20, and a main body on which the lighting system 20 is mounted.

In other words, the mobile object 30 can include the lighting system capable of reducing the differences between the light intensities of the two or more lighting devices 10.

Figure 8:
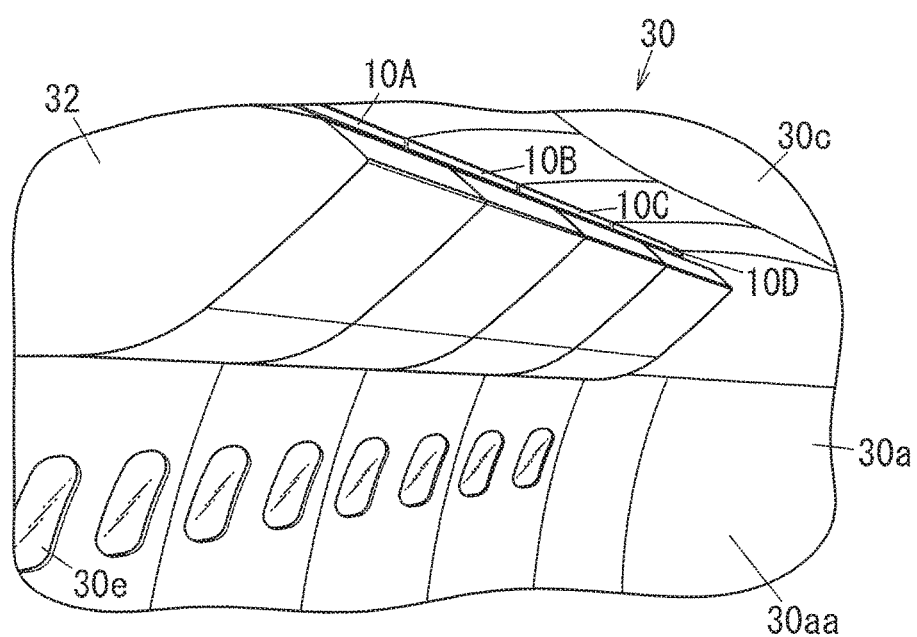
FIG. 8 is a cutaway perspective view of the mobile object of one embodiment.

Hereinafter, an airplane 30a shown in FIG. 8 exemplifying the mobile object 30 is described briefly.

In the airplane 30a, the two or more lighting devices 10 are installed in a cabin 30aa. In the airplane 30a, the control device 21 is installed in a cockpit, for example. The control device 21 is configured to control the two or more lighting devices 10 installed in the cabin 30aa.

In the airplane 30a, there is an overhead compartment 32 which is provided on an uppser side in a vertical direction and is close to windows 30e. The overhead compartment 32 extends in a forward and rearward direction of the airplane 30a to provide an elongated space for accommodating baggage. The overhead compartment 32 is placed in contact with a ceiling material 30c on the upper side. The two or more lighting devices 10 are provided in the upper side in the cabin 30aa of the airplane 30a. The two or more lighting devices 10 are arranged in line along the lengthwise directions of the lighting devices 10. The two or more lighting devices 10 are arranged side by side in line.

The two or more lighting devices 10 are arranged along the forward and rearward direction of the airplane 30a to illuminate the ceiling material 30c inside the cabin 30aa. The lighting device 10 is attached to the ceiling material 30c of the airplane 30a serving as the holder by screwing the legs 4f thereto. The lighting devices 10 are placed so that passengers cannot see them.

In other words, the airplane 30a serves as the main body on which the lighting system 20 is mounted. The mobile object 30 is not limited to the airplane 30a, and examples of the mobile object 30 may include a vehicle such as a train and a bus.

Embodiments of the present disclosure should not be limited to the above embodiments, and the above embodiments may be modified in various ways without departing from the technical concept readable from the present disclosure.

As apparent from the above embodiment, the control device (21) of the first aspect is for individually controlling operations of the two or more lighting devices (10). Each of the two or more lighting devices (10) includes: at least one light source (1a); a sensor (2) configured to output a measurement value obtained by measuring light intensity of the at least one light source (1a); and a controller circuit (3) configured to control lighting state of the at least one light source (1a) according to a command from the control device (21). The control device (21) includes a replacement detector circuit (21a). The replacement detector circuit (21a) is configured to determine whether any of the two or more lighting devices (10) has been replaced with a replacement lighting device (10E), and obtain a determination result distinguishing the replacement lighting device (10E) from one or more remaining lighting devices (10A, 10C, 10D) of the two or more lighting devices (10). The control device (21) is configured to, when the replacement detector circuit (21a) has obtained the determination result, control at least one of the two or more lighting devices (10) based on the measurement value outputted from the sensor (2) of the replacement lighting device (10E) and the one or more measurement values outputted from the one or more sensors (2) of the one or more remaining lighting devices (10A, 10C, 10D), so that a difference between a light intensity of the replacement lighting device (10E) and a light intensity derived from the one or more remaining lighting devices (10A, 10C, 10D) falls within a predetermined range.

The control device (21) of the second aspect would be realized in combination with the first aspect. In the second aspect, the control device (21) includes a history detector circuit (21b). The history detector circuit (21b) includes a timer for measuring total lighting time of each of the two or more lighting devices (10). The replacement detector circuit (21a) is configured to distinguish the replacement lighting device (10E) from the one or more remaining lighting devices (10A, 10C, 10D) of the two or more lighting devices (10), based on lengths of the total lighting time measured by the history detector circuit (21b).

The lighting system (20) of the third aspect includes the control device (21) of the first or second aspect, and the two or more lighting devices (10).

The lighting system (20) of the fourth aspect would be realized in combination with the third aspect. In the second aspect, the at least one light source (1a) includes a first light source (1f) and a second light source (1s). The controller circuit (3) is configured to repeat a cycle multiple times. The cycle is defined as a set of a first time period (T1, T2, T3, T4) in which a light source which is either the first light source (1f) or the second light source (1s) is controlled to emit light so as to allow the sensor (2) to measure a light intensity of the light, and a second time period in which the first light source (1f) and the second light source (1s) are controlled to emit light. The controller circuit (3) is configured to control the lighting state of the at least one light source (1a) so that mixed light of light from the first light source (1f) and light from the second light source (1s) has a same light intensity for each cycle. The sensor (2) is configured to output measurement values obtained by individually measuring a light intensity of the first light source (1f) in the first time period (T1, T2, T3, T4) and a light intensity of the second light source (1s) in the first time period (T1, T2, T3, T4). The controller circuit (3) is configured to individually control lighting states of the first light source (1f) and the second light source (1s).

The lighting system (20) of the fifth aspect would be realized in combination with the third or fourth aspect. In the third aspect, each of the two or more lighting devices (10) further includes a communication circuit (3c) configured to communicate with the control device (21). The communication circuit (3c) is configured to send, to the control device (21), an indication signal indicative of information for identifying the replacement lighting device (10E).

The mobile object (30) of the sixth aspect includes: the lighting system (20) of any one of the third to fifth aspects; a main body (30a) on which the lighting system (20) is mounted.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A control device for individually controlling operations of the two or more lighting devices,
   each of the two or more lighting devices including:
      at least one light source, a sensor configured to output a measurement value obtained by measuring light intensity of the at least one light source; and
      a controller circuit configured to control lighting state of the at least one light source according to a command from the control device,
   the control device comprising a replacement detector circuit,
   the replacement detector circuit being configured to determine whether any of the two or more lighting devices has been replaced with a replacement lighting device, and obtain a determination result distinguishing the replacement lighting device from one or more remaining lighting devices of the two or more lighting devices, and
   the control device being configured to, when the replacement detector circuit has obtained the determination result, control at least one of the two or more lighting devices based on the measurement value outputted from the sensor of the replacement lighting device and the one or more measurement values outputted from the one or more sensors of the one or more remaining lighting devices, so that a difference between a light intensity of the replacement lighting device and a light intensity derived from the one or more remaining lighting devices falls within a predetermined range.

2. The control device of claim 1 further comprising a history detector circuit,
   wherein:
   the history detector circuit includes a timer for measuring total lighting time of each of the two or more lighting devices; and
   the replacement detector circuit is configured to distinguish the replacement lighting device from the one or more remaining lighting devices of the two or more lighting devices, based on lengths of the total lighting time measured by the history detector circuit.

3. A lighting system comprising:
   the control device of claim 1; and
   the two or more lighting devices.

4. The lighting system of claim 3, wherein:
   the at least one light source includes a first light source and a second light source;
   the controller circuit is configured to repeat a cycle multiple times, the cycle is defined as a set of a first time period in which a light source which is either the first light source or the second light source is controlled to emit light so as to allow the sensor to measure a light intensity of the light, and a second time period in which the first light source and the second light source are controlled to emit light, and the controller circuit is configured to control the lighting state of the at least one light source so that mixed light of light from the first light source and light from the second light source has a same light intensity for each cycle;
   the sensor is configured to output measurement values obtained by individually measuring a light intensity of the first light source in the first time period and a light intensity of the second light source in the first time period; and
   the controller circuit is configured to individually control lighting states of the first light source and the second light source.

5. The lighting system of claim 3, wherein:
   each of the two or more lighting devices further includes a communication circuit configured to communicate with the control device;
   the communication circuit is configured to send, to the control device, an indication signal indicative of information for identifying the replacement lighting device.

6. A mobile object comprising:
   the lighting system of claim 3; and
   a main body on which the lighting system is mounted.

7. The control device of claim 1, wherein the light intensity of the replacement lighting device and the light intensity of the one or more remaining lighting devices are both greater than zero when determining the difference between the light intensity of the replacement lighting device and the light intensity derived from the one or more remaining lighting devices.

* * * * *